United States Patent [19]

Kock

[11] Patent Number: 4,831,103

[45] Date of Patent: May 16, 1989

[54] WHOLLY AROMATIC LIQUID-CRYSTALLINE POLYCONDENSATES

[75] Inventor: Hans-Jakob Kock, Ludwigshafen, Fed. Rep. of Germany

[73] Assignee: BASF Aktiengesellschaft, Ludwigshafen, Fed. Rep. of Germany

[21] Appl. No.: 937,875

[22] Filed: Dec. 4, 1986

[30] Foreign Application Priority Data

Dec. 4, 1985 [DE] Fed. Rep. of Germany ....... 3542832

[51] Int. Cl.$^4$ .................. C08G 63/02; C08G 63/18
[52] U.S. Cl. .................. 528/176; 528/173; 528/190; 528/193; 252/299.01; 252/299.63
[58] Field of Search ............... 528/176, 173, 190, 193; 252/299.01, 299.63

[56] References Cited

U.S. PATENT DOCUMENTS

| | | | |
|---|---|---|---|
| 4,066,620 | 1/1978 | Kleinschuster et al. | 260/47 C |
| 4,093,595 | 6/1978 | Elliot | 260/47 C |
| 4,118,372 | 10/1978 | Schaefgen | 528/190 |
| 4,318,841 | 3/1982 | East et al. | 524/605 |
| 4,375,530 | 3/1983 | Hay et al. | 524/605 |
| 4,436,894 | 3/1985 | Urasaki et al. | 528/173 |
| 4,536,561 | 8/1985 | Schmidt et al. | 528/176 |
| 4,564,669 | 1/1986 | Dicke et al. | 528/173 |
| 4,600,764 | 7/1986 | Dicke et al. | 528/193 |

FOREIGN PATENT DOCUMENTS 1507207 4/1978 United Kingdom .
2121422 12/1983 United Kingdom .

OTHER PUBLICATIONS

K. H. Illers–Makromol. Chem. 127, (1969), 1 ff.

*Primary Examiner*—John Kight
*Assistant Examiner*—M. L. Moore
*Attorney, Agent, or Firm*—Keil & Weinkauf

[57] ABSTRACT

Wholly aromatic liquid-crystalline condensates which form a liquid-crystalline fiber-forming melt below 320° C. and are diphase within the range from the glass transition temperature Tg to the melting point and are composed of (a) not less than 10 mol % of repeat units of the formula I

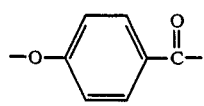

(b) from 5 to 30 mol % of repeat units of the formula II

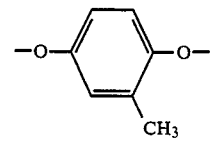

(c) from 0 to 20 mol % of one or more of the repeat units of the formulae III, IV or V

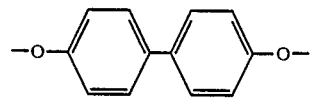

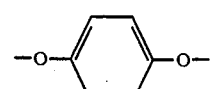

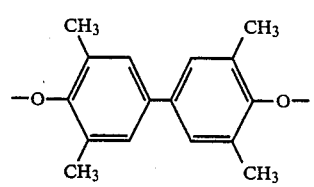

(d) from 0 to 20 mol % of one or more of the repeat units of the formulae VI, VII, VIII or IX

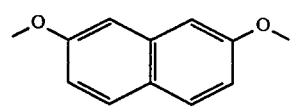

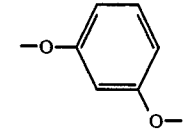

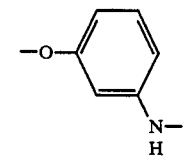

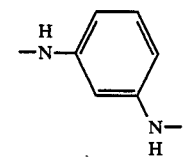

(e) a molar amount corresponding to the total amount of components (b), (c) and (d) of repeat units of the formula X

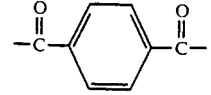

the mole percentage of components (a), (b), (c), (d) and (e) adding up to 100 mol % in each case, the preparation thereof and filaments, fibers, films, moldings and surface coating prepared therefrom.

10 Claims, No Drawings

WHOLLY AROMATIC LIQUID-CRYSTALLINE POLYCONDENSATES

The present invention relates to wholly aromatic liquid-crystalline polycondensates which form a liquid-crystalline fiber-forming melt below 320° C.

Liquid-crystalline polycondensates such as polyesters or polyester amides are known. However, these polymers are in need of improvement in heat distortion resistance, processability and, especially, abrasion resistance. U.S. Pat. No. 4,318,841 describes aromatic polyesters which are based on 2,6-hydroxynaphthalenecarboxylic acid, 4-hydroxybenzoic acid, terephthalic acid and resorcinol. However, the heat distortion resistance of these polymers leaves something to be desired, since they do not have partial crystallinity at any point. This is also true of the mesomorphic polyesters known from German Laid-Open Application No. DOS 3,325,705, which are based on p-hydroxybenzoic acid, terephthalic acid and 2,7-dihydroxynaphthalene with or without hydroquinone. Furthermore U.S. Pat. No. 4,066,620 discloses polyesters which are based on substituted hydroquinones, 4,4'-dihydroxydiphenyl ethers, terephthalic acid or 2,6-naphthalenedicarboxylic acid. However, an anisotropic melt is only obtained at above 300° C. Other liquid-crystalline polyesters disclosed in U.S. Pat. No. 4,093,595, which contain, inter alia, methylhydroquinone as a unit, require a processing temperature of above 320° C.

It is an object of the present invention to develop wholly aromatic liquid-crystalline polycondensates which permit low processing temperatures while having good long-term end-use properties at elevated temperatures and in addition little self-color, a smooth surface and a high chemical resistance.

We have found that this object is achieved with wholly aromatic polycondensates which form a liquid-crystalline melt below 320° C. and are diphase within the range from glass transition temperature $T_g$ to the melting point and which are composed of (a) not less than 10 mol % of repeat units of the formula I

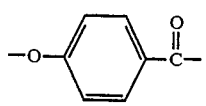
I (b) from 5 to 30 mol % of repeat units of the formula II

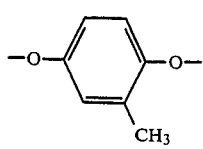
II (c) from 0 to 20 mol % of one or more of the repeat units of the formulae III, IV or V

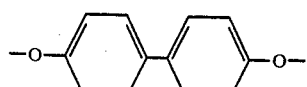
III

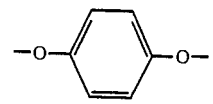
IV

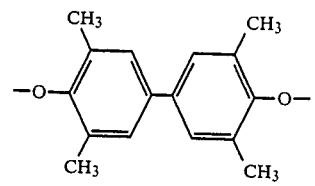
V (d) from 0 to 20 mol % of one or more of the repeat units of the formulae VI, VII, VIII or IX

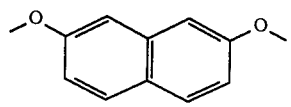
VI

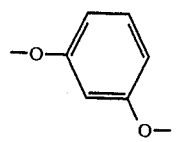
VII

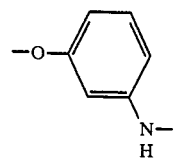
VIII

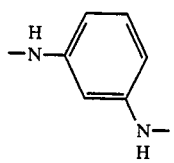
IX (e) a molar amount corresponding to the total amount of components (b), (c) and (d) of repeat units of the formula X

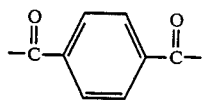
X the mole percentages of components (a), (b), (c), (d) and (e) adding up to 100 mol % in each case.

The novel wholly aromatic liquid-crystalline polycondensates have the advantage of not needing high processing temperatures and, in addition, of having good long-term end-use properties, even above the glass transition temperature. The novel wholly aromatic polycondensates further have high stiffness and resilience, a smooth surface, little self-color and high chemical resistance. It is particularly remarkable that even in processing from the anisotropic melt the partial crystallinity of the novel polycondensates is retained on rapid cooling, and in this way the shaped articles thus produced are guaranteed to have a high heat distortion resistance and dimensional stability.

The liquid-crystalline state of the polycondensates can be detected with a polarization microscope by a method described in German Published Application No. DAS 2,520,819. Applied in a thickness of 10 μm between glass plates and viewed between crossed polarizers, the polycondensate melts have textures which can be ascribed to a mesomorphic phase.

The polycondensates according to the invention are composed of (a) not less than 10 mol %, advantageously not less than 20 mol %, of repeat units of the formula I

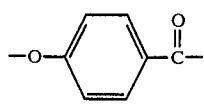     I a suitable starting compound being 4-hydroxybenzoic acid, (b) from 5 to 30 mol %, advantageously from 10 to 25 mol %, of repeat units of the formula II

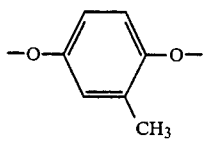     II an advantageous starting material being methylhydroquinone, (c) from 0 to 20 mol %, in particular from 2 to 18 mol %, of one or more of the repeat units of the formulae III, IV or V

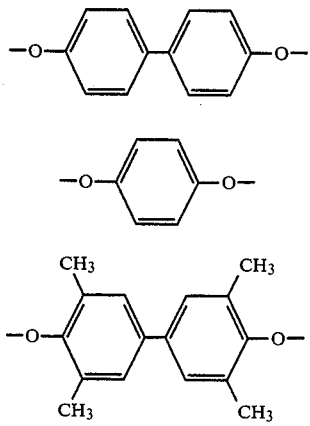

III

IV

V advantageous starting materials being 4,4'-dihydroxydiphenyl for units of the formula III, hydroquinone for units of the formula IV and 3,3',5,5'-tetramethyl-4,4'-dihydroxydiphenyl for units of the formula V, (d) from 0 to 20 mol %, advantageously from 2 to 15 mol %, of one or more of the repeat units of the formulae VI, VII, VIII or IX

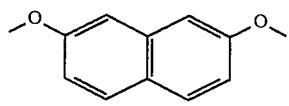     VI

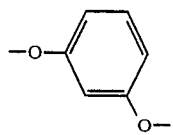     VII

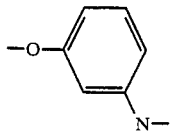     VIII

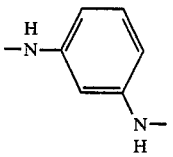     IX advantageous starting materials being 2,7-dihydroxynaphthalene for units of the formula VI, resorcinol for units of the formula VII, m-aminophenol for units of the formula VIII and m-phenylenediamine for units of the formula IX, (e) a molar amount corresponding to the total amount of components (b), (c) and (d) of repeat units of the formula X

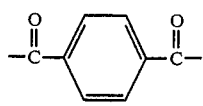     X an advantageous starting material being terephthalic acid, and the mole percentages of components (a), (b), (c), (d) and (e) adding up to 100 mol % in each case.

It is also possible to replace some of the units of the formula X, for example up to 50% of the required molar amount, by repeat units of the formula XI

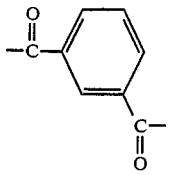     XI a suitable starting compound being for example isophthalic acid.

It is further possible to replace some of component (a), for example up to 15 mol %, by one or more of the repeat units of the formulae XII, XIII or XIV

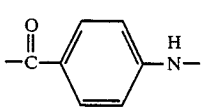     XII

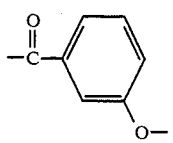     XIII

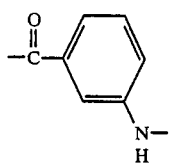

XIV suitable starting compounds being p-aminobenzoic acid for units of the formula XII, m-hydroxybenzoic acid for units of the formula XIII and m-aminobenzoic acid for units of the formula XIV.

Preferred wholly aromatic polycondensates have a glass transition temperature Tg of $\geqq 90°$ C., in a particular of $\geqq 130°$ C. The glass transition temperature is measured by the DSC method as described by K. H. Illers in Makromol. Chem. 127 (1969), 1 ff. The wholly aromatic liquid-crystalline polycondensates form a liquid-crystalline fiber-forming melt at $<320°$ C., in particular $<300°$ C. The polycondensates according to the invention are diphase within the range from the glass transition temperature Tg to the melting point, the melting point of the partially crystalline phase being advantageously within the range from $\geqq 240°$ C. to $\leqq 290°$ C.

In preferred polycondensates, partial crystallinity is observed even on cooling down from the anisotropic melt at the fast rate of $\geqq 300°$/min to below the glass transition temperature. This has the effect that the partial crystallinity is reflected even above the glass transition point in an improved heat distortion resistance and dimensional stability of the shaped articles thus produced.

The liquid-crystalline polycondensates according to the invention are obtainable for example in a manner similar to that described in U.S. Pat. Nos. 4,375,530 and 4,118,372. The mass condensation generally includes an alkanoylating stage, in which the monomers used are reacted with acid anhydrides, and a polymerization stage, in which the polycondensate is formed by elimination of aliphatic carboxylic acids. Processes which include a prepolymerization stage can be found in German Laid-Open Application No. DOS 3,320,118. However, the processes described therein require reaction times of more than 10 hours.

In an advantageous embodiment, the polycondensates according to the invention are obtained in a single-stage process by converting the underivatized starting materials in the molar ratio described using anhydrides of lower fatty acids, for example fatty acids of 2 to 4 carbon atoms, in particular acetic anhydride. The polycondensation and transesterification reactions may be catalyzed by means of prior art catalysts, used in amounts of from 0.001 to 1% by weight. In the reaction, the underivatized starting materials are heated together with the fatty acid anhydride, which is advantageously present in a molar excess of not less than 5%, based on the hydroxyl and amino groups present, with stirring in an inert gas atmosphere to a temperature at which reflux is observed. Advantageously the temperature is increased in stages, for example to 130°–170° C. in not more than 5 hour, preferably up to 2 hours. The temperature is then raised to 250°–350° C., for example in the course of 2–2½ hours, while excess fatty acid anhydrides and fatty acids are distilled off. To complete the reaction, it has been found to be advantageous to employ reduced pressure, for example 0.5 mbar, preferably of from 10 to 50 mbar, toward the end of the reaction.

It is a remarkable and unforeseeable feature of this single-stage process that the desired polymers are obtained in a relatively short time in a troublefree and complete reaction even without catalysts. This is all the more astonishing as the large number of chemically different hydroxyl and amino groups would be expected to lead to differences in reactivity and hence to inadequate polymer synthesis.

The wholly aromatic liquid-crystalline polycondensates thus obtained from the condensation in the melt are advantageously further condensed in the solid state, for example at 150°–250° C., until the desired viscosity is obtained. This postcondensation in solid phase can take place not only before but also after thermoplastic processing. The solid phase condensation is advantageously carried out in an inert gas atmosphere, for example nitrogen.

The polycondensates according to the invention can contain conventional additives and assistance in active amounts. Conventional additives are stabilizers against degradation by molecular oxygen, heat or UV light, for example sterically hindered phenols, hydroquinones, substituted resorcinols, salicylates, benzotriazoles or benzophenones.

Other suitable additives are dyes and pigments such as nicrosine, titanium dioxide and phthalocyanines.

Suitable additives also include fibrous and pulverulent fillers and reinforcing agents, for example in amounts of up to 70% by weight, such as carbon fibers, glass fibers, amorphous silica, asbestos, magnesium silicate, aluminum silicate, magnesium carbonate, chalk or feldspar.

The wholly aromatic liquid-crystalline polycondensates according to the invention are suitable for preparing fibers, filaments, films, foams and industrial moldings by injection molding, pressing or extruding. The moldings prepared from the polycondensates according to the invention have excellent mechanical properties, such as stiffness, strength and resilience. They are substantially resistant to chemicals and flame-retardant. They also have a high heat distortion resistance and a smooth abrasion-resistant surface. The polycondensates according to the invention are therefore highly suitable for preparing moldings for electrical engineering and data processing, automotive construction and other industrial sectors. But they can also be used as surface coating materials, in the form of pulverulent dispersions or as film.

The invention is illustrated in the following examples.

EXAMPLE 1

0.2 mol (30.3 mol %) of terephthalic acid, 0.26 mol (39.4 mol %) of 4-hydroxybenzoic acid, 0.03 mol (4.5 mol %) of 2,7-dihydroxynaphthalene, 0.04 mol (6.1 mol %) of 4,4'-dihydroxybiphenyl, 0.13 mol (19.7 mol %) of methylhydroquinone and 0.86 mol of acetic anhydride are heated under nitrogen in a metal bath to 100° C. The temperature is then raised to 150° C. in 30', to 200° C. in a further 100' and finally to 300° C. in 120'.

The pressure is then reduced to 560 mbar and then by half every 10'. The final vacuum is 50 mbar. In this way a highly viscous fiber-forming melt is obtained. Polymer melt and solidified polymer have a pearlescent luster. DSC measurements indicate a glass transition temperature of 110° C. and a melting point of 260° C. (peak maximum). A homogeneous liquid-crystalline melt from which the polymer can be processed exists above 260° C.

The intrinsic viscosity is 1.3 dl/g, measured at 60° C. in a 0.1% strength by weight solution in pentafluorophenol.

EXAMPLE 2

The method of Example 1 is used to react 0.2 mol of terephthalic acid (30.3 mol %), 0.26 mol of 4-hydroxybenzoic acid (39.4 mol %), 0.04 mol of 4,4'-dihydroxybiphenyl (6.1 mol %), 0.16 mol of methylhydroquinone (24.2 mol %) and 0.86 mol of acetic anhydride.

The final temperature is 315° C.; the final pressure is 20 mbar.

The product obtained is liquid-crystalline. DSC measurements indicate a glass transition temperature of 93° C. and a melting point of 280° C. The intrinsic viscosity of 0.8 dl/g.

I claim:

1. A wholly aromatic liquid-crystalline polycondensate which forms a liquid-crystalline fiber-forming melt below 320° C. and is diphase within the range from the glass transition temperature Tg to the melting point, composed of (a) not less than 10 mol % of repeat units of the formula I

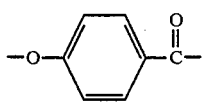
I (b) from 5 to 30 mol % of repeat units of the formula II

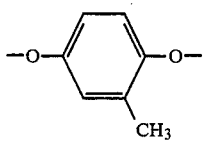
II (c) from 0 to 20 mol % of one or more of the repeat units of the formulae III, IV or V

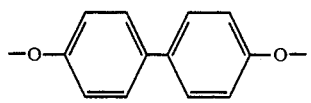
III

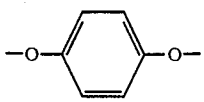
IV

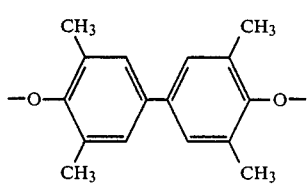
V (d) from 0 to 20 mol % of one or more of the repeat units of the formulae VI, VII, VIII or IX

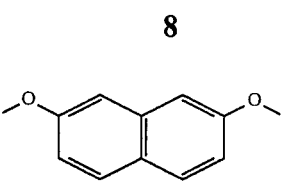
VI

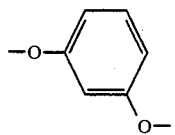
VII

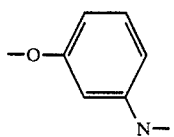
VIII

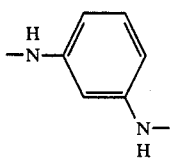
IX (e) a molar amount corresponding to the total amount of components (b), (c) and (d) of repeat units of the formula X

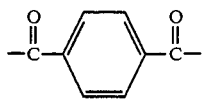
X the mole percentages of components (a), (b), (c), (d) and (e) adding up to 100 mol % in each case.

2. A wholly aromatic liquid-crystalline polycondensate as claimed in claim 1, wherein a portion of the component of the formula X is replaced by repeat units of the formula XI

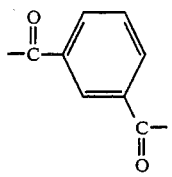
XI

3. A wholly aromatic liquid-crystalline polycondensate as claimed in claim 1, wherein a portion of the component of the formula I is replaced by one or more of the repeat units of the formulae XII, XIII or XIV

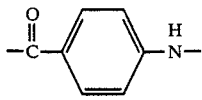
XII

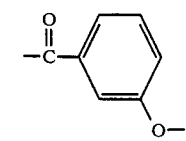
XIII

-continued

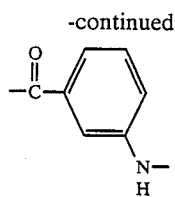
XIV

4. A wholly aromatic liquid-crystalline polycondensate as claimed in claim 1, wherein the partially crystalline phase has a melting point $\geq 240°$ C. and $\leq 290°$ C.

5. A wholly aromatic liquid-crystalline polycondensate as claimed in claim 1, which is partially crystalline after cooling down the melt at a rate of $\geq 300°$ C./min to below the glass transition temperature Tg.

6. A filament prepared from a wholly aromatic polycondensate as claimed in claim 1.

7. A fiber prepared from a wholly aromatic polycondensate as claimed in claim 1.

8. A film prepared from a wholly aromatic polycondensate as claimed in claim 1.

9. A molding prepared from a wholly aromatic polycondensate as claimed in claim 1.

10. A surface coating prepared from a wholly aromatic polycondensate as claimed in claim 1.

* * * * *